March 9, 1943.         A. A. BAILLY         2,313,287
DRIVE FOR THE SPINDLES OF MACHINE TOOLS
Filed Jan. 11, 1940
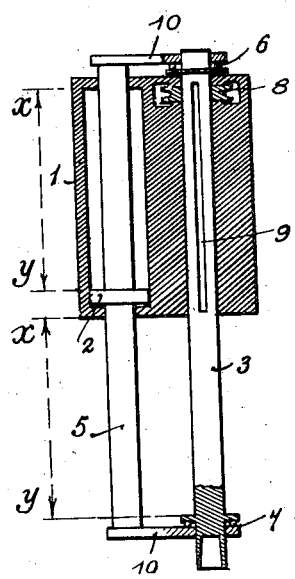
Inventor
André A. Bailly.
by
Atty Patented Mar. 9, 1943

2,313,287

UNITED STATES PATENT OFFICE 2,313,287

DRIVE FOR THE SPINDLES OF MACHINE TOOLS

André Albert Bailly, Chatillon sous Bagneux, France; vested in the Alien Property Custodian Application January 11, 1940, Serial No. 313,441
In France January 11, 1939

2 Claims. (Cl. 51—34)

In particular, machines for grinding bores are provided with a spindle which is rotated and which is adapted to have rectilinear reciprocating movements imparted thereto by means of a hydraulic motor. For this purpose, the spindle is connected to the piston of said motor, while a mechanical transmission simultaneously engages said spindle and imparts thereto the required rotary movement.

In the present day machines, the cylinder-piston unit has the same axis as the spindle, so that the assemblies thus obtained include parts which, when placed end to end, are equal to three times the length of the stroke used for displacing the tool (grinding tool for example). Owing to this fact, such machines are very bulky and the heavy weight limits the speed of the reciprocating movement at the same time as the possibility of obtaining long useful strokes.

The purpose of the present invention is to remedy this drawback and, in order to reduce the length of the spindle-cylinder assembly, it is characterized by the fact that these two members are so arranged that they have different and parallel axes.

In the accompanying diagrammatical drawing and by way of example, the figure is a grinding machine constructed in accordance with the present invention.

According to the improvement which is the object of the present invention, the spindle 3 is arranged parallel with the cylinder 1, so that the length of this arrangement is at most only twice the useful stroke of the tool. In the embodiment shown by way of example only, the grooves 9 for rotating the spindle 3 are placed on a level with the cylinder 1. The rotation of the spindle 3 is obtained by any appropriate means (pulley 8, gear, etc.). The reciprocating movements of the spindle 3 are obtained by means of two supports 10 arranged in such a manner as to connect the corresponding ends of the rod 5 of the piston 2 and of the tool holder spindle 3. These supports or yokes 10 are, for example, secured to the rod 5 of the piston 2 and drive the spindle 3 by means of the abutments 6 and 7.

This coupling might only be provided at one of the ends of the rod 5 of the piston 2; in this case, the coupling support 10 would be provided with a double bearing abutment for driving the spindle in one direction or in the other.

While I have illustrated and described the preferred form of construction for carrying my invention into effect, this is capable of variation and modification, without departing from the spirit of the invention. I therefore do not wish to be limited to the precise details of construction set forth, but desire to avail myself of such variations and modifications as come within the scope of the appended claims.

I claim:

1. In a machine tool designed particularly for grinding machines, comprising a support formed at one side of its longitudinal center with a bore designed to accurately receive and guide a tool spindle, a tool spindle in said bore and capable of rotary and reciprocatory movement therein, means mounted in the support to be driven for imparting rotary movement to the spindle, the support beyond the longitudinal center relative to the bore being formed as a cylinder, a piston fitting and movable in the cylinder, a rod connected to the piston and extending above and below the cylinder, the tool spindle and rod being maintained at all times in parallel relation, and means connecting the respective ends of the rod with the similar ends of the spindle, whereby the piston serves to move the spindle in both directions longitudinally of the support during rotation of the spindle.

2. In a grinding machine tool, including a support formed to accurately receive and guide a tool spindle, a tool spindle mounted in said support formation for rotary and reciprocating movement, means in the support for rotating the spindle, a cylinder formed in the support independently of the spindle mounting, a piston fitting and movable in the cylinder, and a piston rod connected to the piston and extending through and in both directions beyond the support in parallelism with the spindle, and means connecting the piston, rod and spindle at points beyond the respective ends of the support.

ANDRÉ ALBERT BAILLY.